(12) United States Patent
Park et al.

(10) Patent No.: US 10,509,670 B2
(45) Date of Patent: Dec. 17, 2019

(54) DATA STORAGE DEVICE AND OPERATING METHOD THEREOF

(71) Applicant: SK hynix Inc., Gyeonggi-do (KR)

(72) Inventors: Jeen Park, Gyeonggi-do (KR); Jong Min Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 134 days.

(21) Appl. No.: 15/825,315

(22) Filed: Nov. 29, 2017

(65) Prior Publication Data
US 2018/0293101 A1    Oct. 11, 2018

(30) Foreign Application Priority Data

Apr. 11, 2017  (KR) .................. 10-2017-0046530

(51) Int. Cl.
| | | |
|---|---|---|
| *G06F 9/48* | (2006.01) | |
| *G06F 9/50* | (2006.01) | |
| *G06F 9/54* | (2006.01) | |
| *G06F 13/372* | (2006.01) | |
| *G06F 9/38* | (2018.01) | |
| *G06F 13/16* | (2006.01) | |

(52) U.S. Cl.
CPC .......... *G06F 9/4881* (2013.01); *G06F 9/3855* (2013.01); *G06F 9/5038* (2013.01); *G06F 9/546* (2013.01); *G06F 13/1642* (2013.01); *G06F 13/372* (2013.01)

(58) Field of Classification Search
None
See application file for complete search history.

(56) References Cited

U.S. PATENT DOCUMENTS

| | | | | |
|---|---|---|---|---|
| 2011/0321058 A1* | 12/2011 | Schmidt | .................. | G06F 9/505 |
| | | | | 718/105 |
| 2014/0237477 A1* | 8/2014 | Cadambi | ............... | G06F 9/4881 |
| | | | | 718/103 |
| 2014/0325524 A1* | 10/2014 | Zangaro | ................ | G06F 9/5083 |
| | | | | 718/105 |
| 2017/0133085 A1* | 5/2017 | Kim | ...................... | G06F 3/0619 |
| 2017/0351582 A1* | 12/2017 | Ebsen | ................. | G06F 11/1008 |
| 2018/0165229 A1* | 6/2018 | Chhabra | ............. | G06F 13/1626 |

FOREIGN PATENT DOCUMENTS

KR    101481898    1/2015

* cited by examiner

*Primary Examiner* — Wynuel S Aquino
(74) *Attorney, Agent, or Firm* — IP & T Group LLP

(57) ABSTRACT

A method for operating a data storage device, the method comprising: enqueuing requests for a nonvolatile memory device, received from a host device, in a first queue; determining whether a starvation time of a request which is not enqueued in a second queue and has a relatively low priority, among the requests queued in the first queue is reaching to a predetermined response time; and enqueuing, based on a determination result, any one between the request which has the low priority and a request which is not enqueued in the second queue and has a high priority among the requests queued in the first queue, in the second queue.

14 Claims, 11 Drawing Sheets

DATA STORAGE DEVICE AND OPERATING METHOD THEREOF

CROSS-REFERENCES TO RELATED APPLICATION

The present application claims priority under 35 U.S.C. § 119(a) to Korean application number 10-2017-0046530, filed on Apr. 11, 2017, which is herein incorporated by reference in its entirety.

BACKGROUND

1. Technical Field

Various embodiments generally relate to a data storage device which uses a nonvolatile memory device as a storage medium.

2. Related Art

Recently, the paradigm for the computer environment has been changed into ubiquitous computing so that computer systems can be used anytime and anywhere. Accordingly, the use of portable electronic devices such as mobile phones, digital cameras, and notebook computers has rapidly increased. In general, portable electronic devices use a data storage device which uses a memory device. A data storage device is used to store data to be used in a portable electronic device.

A data storage device using a memory device has excellent stability and durability since it does not include a mechanical driving unit. Also, a data storage device using a memory device is advantageous in that it may access data faster and consume less power. Non-limiting examples of a data storage device having such advantages include a universal serial bus (USB) memory device, memory cards having various interfaces, a universal flash storage (UFS) device, and a solid state drive (SSD).

SUMMARY

Various embodiments are directed to a data storage device which is capable of reordering a request from a host device in such a manner that the request may be processed efficiently, and an operating method thereof.

In an embodiment, a method for operating a data storage device, the method comprising: enqueuing requests for a nonvolatile memory device, received from a host device, in a first queue; determining whether a starvation time of a request which is not enqueued in a second queue and has a relatively low priority, among the requests queued in the first queue is reaching to a predetermined response time; and enqueuing based on a determination result, any one between the request which has the low priority and a request which is not enqueued in the second queue and has a high priority among the requests queued in the first queue, in the second queue.

In an embodiment, a data storage device may include: a first queue suitable for queuing requests received from a host device; a second queue suitable for queuing some of the requests queued in the first queue; and a host interface unit suitable for enqueuing the requests queued in the first queue, in the second queue such that the requests are reordered, wherein the host interface unit determines a degree to which a starvation time of a request which is not enqueued in a second queue and has a relatively low priority, among the requests queued in the first queue is reaching to a predetermined response time, and enqueues, based on a determination result, any one between the request which has the low priority and a request which is not enqueued in the second queue and has a high priority among the requests queued in the first queue, in the second queue.

According to the embodiments, a request from a host device may be processed efficiently.

DETAILED DESCRIPTION

Figure 1:
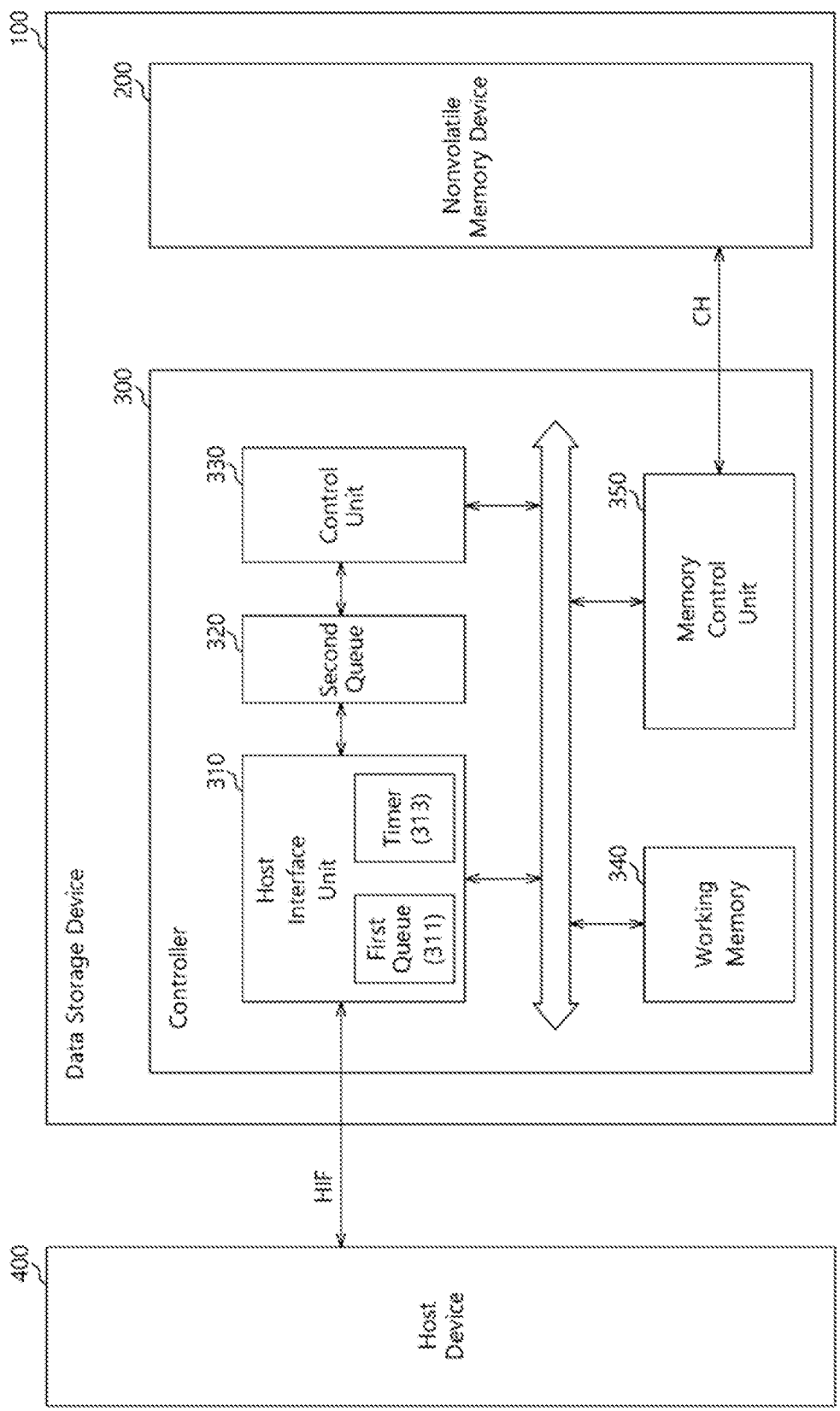
FIG. 1 is a block diagram illustrating a data storage device in accordance with an embodiment.

In the present invention, advantages, features and methods for achieving them will become more apparent after a reading of the following exemplary embodiments taken in conjunction with the drawings. The present invention may, however, be embodied in different forms and should not be construed as being limited to the embodiments set forth herein. Rather, these embodiments are provided to describe the present invention in detail to the extent that a person skilled in the art to which the invention pertains can easily enforce the technical concept of the present invention.

It is to be understood herein that embodiments of the present invention are not limited to the particulars shown in the drawings and that the drawings are not necessarily to scale and in some instances proportions may have been exaggerated in order to more clearly depict certain features of the invention. While particular terminology is used herein, it is to be appreciated that the terminology used herein is for the purpose of describing particular embodiments only and is not intended to limit the scope of the present invention.

As used herein, the term "and/or" includes any and all combinations of one or more of the associated listed items.

It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

Hereinafter, a data storage device and an operating method thereof will be described below with reference to the accompanying drawings through various examples of embodiments.

FIG. 1 is a block diagram illustrating a data storage device 100 in accordance with an embodiment. Referring to FIG. 1, the data storage device 100 may store data to be accessed by a host device 400 such as a mobile phone, an MP3 player, a laptop computer, a desktop computer, a game player, a television (TV), an in-vehicle infotainment system, and so forth. The data storage device 100 may also be referred to as a memory system.

The data storage device 100 may be implemented with any one among various types of storage devices according to a host interface HIF meaning a transmission protocol with respect to the host device 400. For example, the data storage device 100 may be implemented with any one of various types of storage devices such as a solid state drive (SSD), a multimedia card such as an MMC, an eMMC, an RS-MMC and a micro-MMC, a secure digital card such as SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-e) card type storage device, a compact flash (CF) card, a smart media card, a memory stick, and so forth.

The data storage device 100 may be implemented with any one among various types of package types. For example, the data storage device 100 may be manufactured as any one of various kinds of package types such as a package-on-package (POP), a system-in-package (SIP), a system-on-chip (SOC), a multi-chip package (MCP), a chip-on-board (COB), a wafer-level fabricated package (WFP) and a wafer-level stack package (WSP).

The data storage device 100 may include a nonvolatile memory device 200 and a controller 300. The nonvolatile memory device 200 may be coupled with the controller 300 through a channel CH which includes at least one signal line capable of transmitting a command, an address, control signals and data. The nonvolatile memory device 200 may be used as the storage medium of the data storage device 100.

The nonvolatile memory device 200 may be configured by any one of various types of nonvolatile memory devices such as a NAND flash memory device, a NOR flash memory device, a ferroelectric random access memory (FRAM) using a ferroelectric capacitor, a magnetic random access memory (MRAM) using tunneling magneto-resistive (TMR) layer, a phase change random access memory (PCRAM) using a chalcogenide alloy, and a resistive random access memory (RERAM) using a transition metal oxide. The ferroelectric random access memory (FRAM) the magnetic random access memory (MRAM), the phase change random access memory (PCRAM) and the resistive random access memory (RERAM) are a kind of nonvolatile random access memory devices capable of random access to memory cells. The nonvolatile memory device 200 may be configured by a combination of a NAND flash memory device and the above-described various types of nonvolatile random access memory devices.

The controller 300 may include a host interface unit 310, a second queue 320, a control unit 330, a working memory 340, and a memory control unit 350. The host interface unit 310 may include a first queue 311.

The host interface unit 310 may interface the host device 400 with the data storage device 100. For example, the host interface unit 310 may communicate with the host device 400 by using the host interface HIF, that is, any one among standard transmission protocols such as universal serial bus (USB), universal flash storage (UFS), multimedia card (MMC), parallel advanced technology attachment (PATA), serial advanced technology attachment (SATA), small computer system interface (SCSI), serial attached SCSI (SAS), peripheral component interconnection (PCI) and PCI express (PCI-e) protocols.

The host interface unit 310 may perform a request queuing operation or a command queuing operation. The host interface unit 310 may receive a request from the host device 400, and enqueue the received request in the first queue 311. The host interface unit 310 may enqueue some of requests queued in the first queue 311, in the second queue 320. The host interface unit 310 may enqueue the requests queued in the first queue 311, in the second queue 320, such that the requests queued in the first queue 311 may be reordered based on various references.

The host interface unit 310 may include a function block which is needed for a request queuing operation based on a starvation of a request, for example, a timer 313.

The second queue 320 may be coupled between the host interface unit 310 and the control unit 330. The second queue 320 may be used for request exchange between the host interface unit 310 and the control unit 330. The second queue 320 may be configured in the type of a linked queue or a circular queue.

The control unit 330 may be implemented with a micro control unit (MCU) or a central processing unit (CPU). The control unit 330 may process a request queued in the second queue 320. In order to process the request, the control unit 330 may drive an instruction or algorithm of a code type, that is, a software, loaded in the working memory 340, and may control internal function blocks or the nonvolatile memory device 200.

Figure 2:
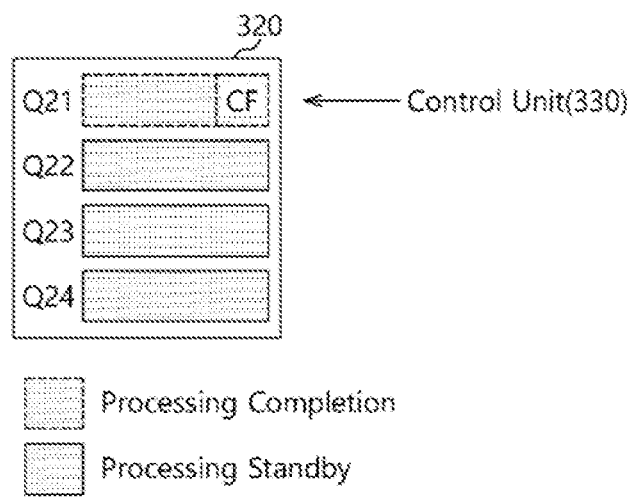
FIGS. 2 and 3 are diagrams illustrating methods for notifying processing-completed request in accordance with embodiments.
Figure 3:
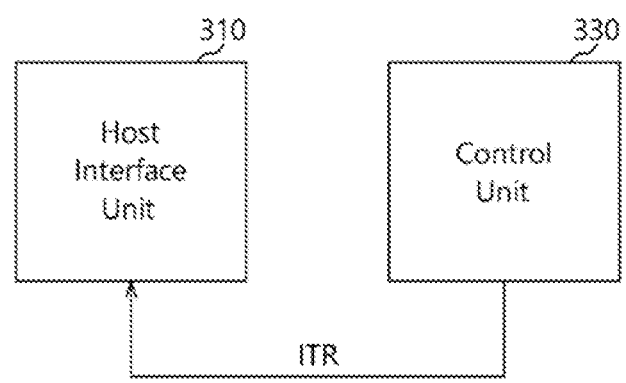

The control unit 330 may notify the host interface unit 310 that there is a processing-completed request. For example, as shown in FIG. 2, the control unit 330 may notify processing completion of a request in such a way as to record a completion flag CF in an area Q21 of the second queue 320 in which processing-completed request is queued. On the other hand, the remaining areas Q22, Q23 and Q24 of the second queue 320 are areas corresponding to processing standby requests. For another example, as shown in FIG. 3, the control unit 330 may notify processing completion of a request in such a way as to transmit an interrupt ITR to the host interface unit 310.

The working memory 340 may be implemented with a random access memory such as a dynamic random access memo (DRAM) or a static random access memory (SRAM). The working memory 340 may store a software to be driven by the control unit 330. Also, the working memory 340 may store the data needed to drive the software.

The memory control unit 350 may control the nonvolatile memory device 200 according to control of the control unit 330. The memory control unit 350 may also be referred to as a memory interface unit. The memory control unit 350 may provide control signals to the nonvolatile memory device 200. The control signals may include a command, an address, a control signal and so forth for controlling the nonvolatile memory device 200. The memory control unit 350 may provide data to the nonvolatile memory device 200 or may be provided with the data read out from the nonvolatile memory device 200.

Figure 4:
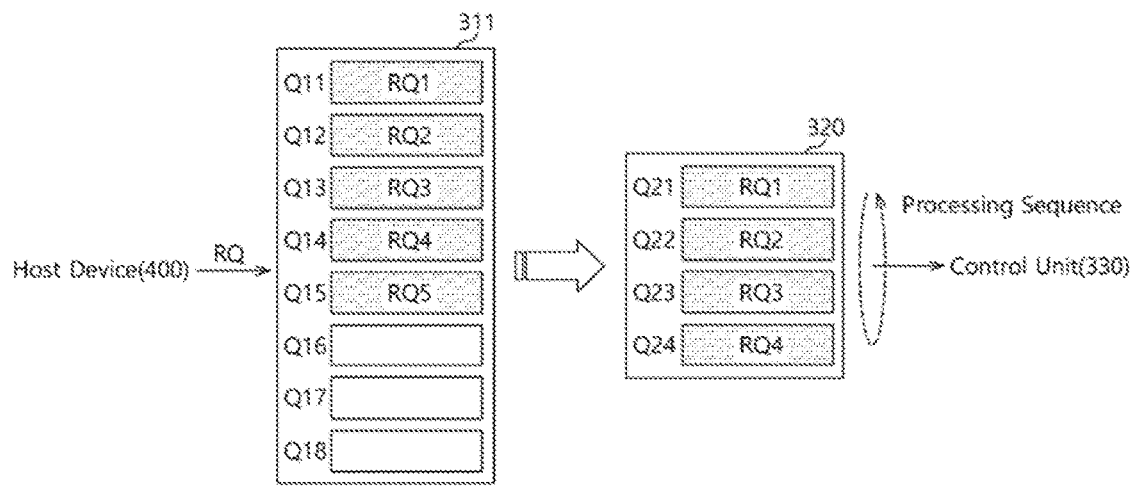
FIG. 4 is a diagram illustrating a request queuing operation based on a reception order of a request in accordance with an embodiment.

FIG. 4 is a diagram illustrating a request queuing operation based on a reception order of a request in accordance with an embodiment. As an example, a state in which five requests RQ1 to RQ5 are received from the host device 400 is illustrated in FIG. 4. For example, the request queuing operation of FIG. 4 may be performed by the data storage device 100 of FIG. 1.

Referring to FIG. 4, the host interface unit 310 may enqueue the requests RQ1 to RQ5 in the first queue 311 in a sequence in which they are received. For example, the host interface unit 310 may enqueue the requests RQ1 to RQ5 in areas Q11 to Q15 of the first queue 311, respectively. The host interface unit 310 may queue the requests RQ1 to RQ5 queued in the first queue 311, in the second queue 320 in the sequence in which they are received. For example, the host interface unit 310 may queue the requests RQ1 to RQ4 in the second queue 320. That is, the host interface unit 310 may enqueue the requests RQ1 to RQ4 in areas Q21 to Q24 of the second queue 320, respectively.

The control unit 330 may process the requests RQ1 to RQ4 which are queued in the second queue 320, in a sequence in which they are queued. For example, the control unit 330 may process the requests RQ1 to RQ4 in the sequence of the first request RQ1 to the fourth request RQ4. If processing of the first request RQ1 is completed, the host interface unit 310 may queue the remaining request queued in the first queue 311, that is, the fifth request RQ5, in the second queue 320.

Figure 5:
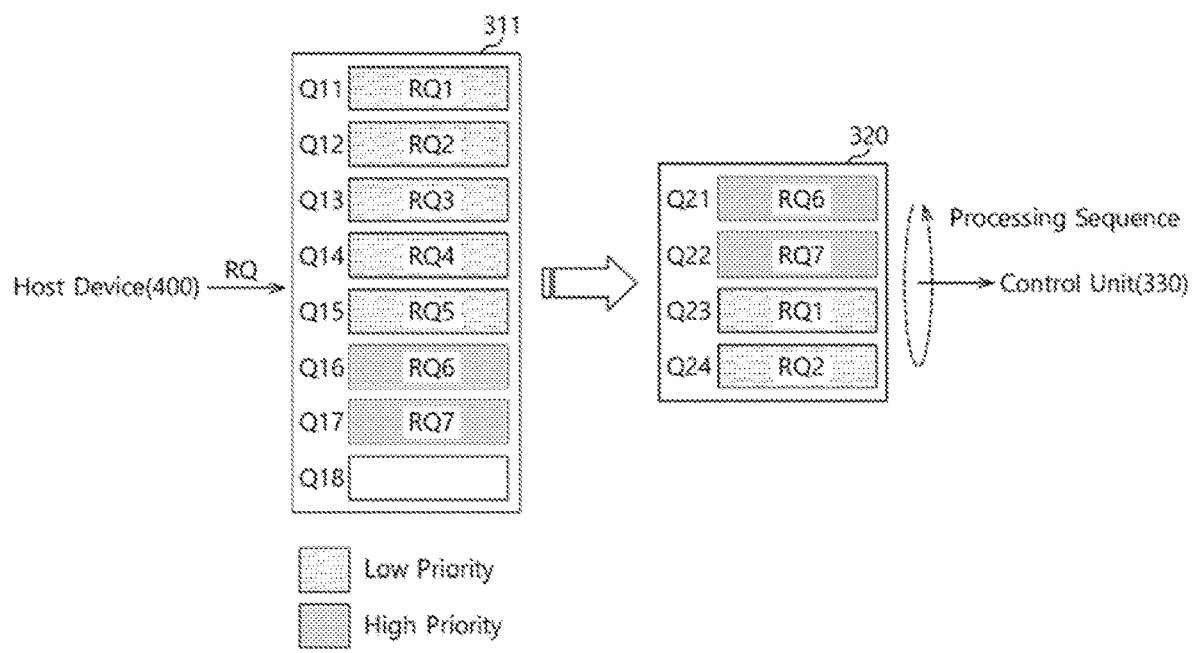
FIG. 5 is a diagram illustrating a request queuing operation based on a priority of a request in accordance with an embodiment.

FIG. 5 is a diagram illustrating a request queuing operation based on a priority of a request in accordance with an embodiment. For example, a state in which seven requests RQ1 to RQ7 are received from the host device 400 is illustrated in FIG. 5. For example, the request queuing operation of FIG. 5 may be performed by the data storage device 100 of FIG. 1.

Referring to FIG. 5, the host interface unit 310 may enqueue the requests RQ1 to RQ7 in the first queue 311 in a sequence in which they are received. For example, the host interface unit 310 may enqueue the requests RQ1 to RQ7 in areas Q11 to Q17 of the first queue 311, respectively. The requests RQ6 and RQ7 are requests having relatively high priorities, and the requests RQ1 to RQ5 are requests having low priorities. The host interface unit 310 may queue the requests RQ1 to RQ7 queued in the first queue 311, in the second queue 320, such that requests may be reordered based on priorities of the requests. For example, the host interface unit 310 may respectively queue the requests RQ6 and RQ7 having high priorities, in areas Q21 and Q22 of the second queue 320. Then, the host interface unit 310 may respectively queue the requests RQ1 and RQ2 having low priorities, in areas Q23 and Q24 of the second queue 320, in the sequence in which they are received.

The control unit 330 may process the requests RQ6, RQ7, RQ1 and RQ2 which are queued in the second queue 320, in a sequence in which they are queued. For example the control unit 330 may process the requests RQ6, RQ7, RQ1 and RQ2 in the sequence of the sixth request RQ6, the seventh request RQ7, the first request RQ1 and the second request RQ2. As processing of the requests RQ6, RQ7, RQ1 and RQ2 is completed, the host interface unit 310 may queue the remaining requests queued in the first queue 311, that is, the requests RQ3 to RQ5, in the second queue 320, in the sequence in which they are received.

If requests are reordered based on priorities of the requests, the requests RQ6 and RQ7 having high priorities may be processed first, and the requests RQ1 to RQ5 having low priorities may be processed later.

Figure 6:
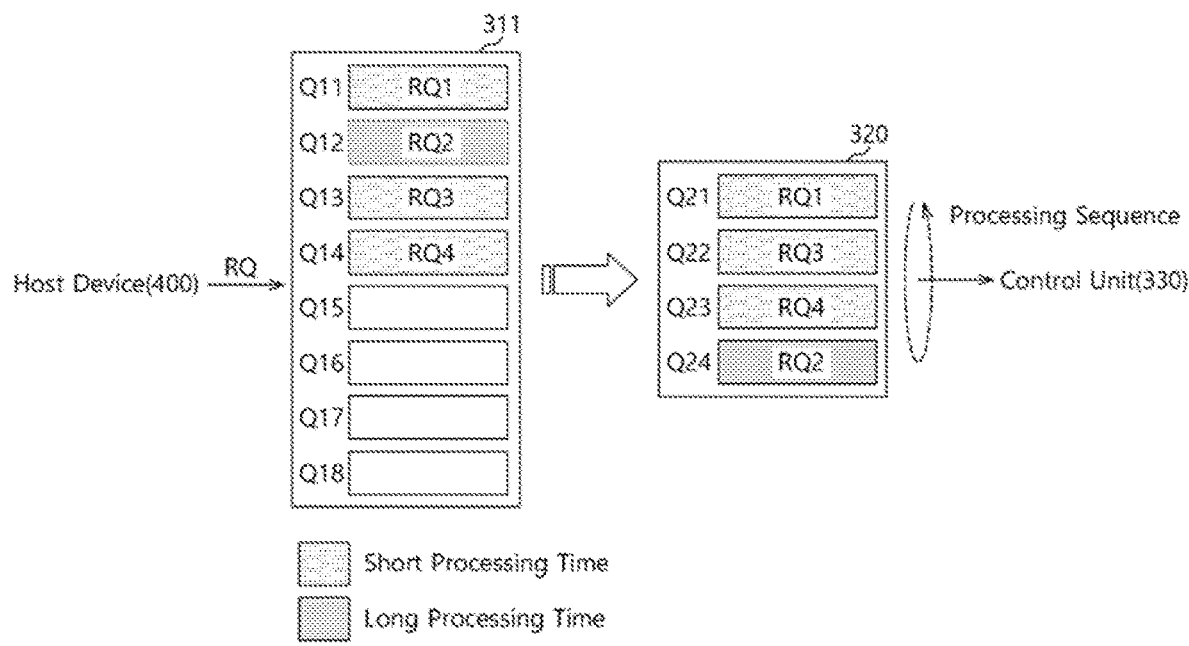
FIG. 6 is a diagram illustrating a request queuing operation based on a processing time of a request in accordance with an embodiment.

FIG. 6 is a diagram illustrating a request queuing operation based on a processing time of a request in accordance with an embodiment. For example, a state in which four requests RQ1 to RQ4 are received from the host device 400 is illustrated in FIG. 6, For example, the request queuing operation of FIG. 6 may be performed by the data storage device 100 shown in FIG. 1.

Referring to FIG. 6, the host interface unit 310 may enqueue the requests RQ1 to RQ4 in the first queue 311 in a sequence in which they are received. For example, the host interface unit 310 may enqueue the requests RQ1 to RQ4 in areas Q11 to Q14 of the first queue 311, respectively. The requests RQ1, RQ3 and RQ4 are requests having relatively short processing time, and the request RQ2 is a request having relatively long processing time. The host interface unit 310 may queue the requests RQ1 to RQ4 queued in the first queue 311, in the second queue 320, such that requests may be reordered based on processing times of the requests. For example, the host interface unit 310 may respectively queue the requests RQ1, RQ3 and RQ4 having short processing times, in areas Q21 to Q23 of the second queue 320. Then, the host interface unit 310 may queue the request. RQ2 having a long processing time, in area Q24 of the second queue 320.

The control unit 330 may process the requests RQ1 to RQ4 which are queued in the second queue 320, in a sequence in which they are queued. For example, the control unit 330 may process the requests RQ1 to RQ4 in the sequence of the first request RQ1, the third request RQ3, the fourth request RQ4 and the second request RQ2.

If requests are reordered based on processing times of the requests, the requests RQ1, RQ3 and RQ4, for example, read requests, having short processing times may be processed first, and the request RQ2, for example, a write request, having a long processing time may be processed later.

FIGS. 7 to 10 are diagrams illustrating examples of a request queuing operation based on a starvation of a request in accordance with an embodiment. For example, the request queuing operation of FIGS. 7 to 10 may be performed by the data storage device 100 shown in FIG. 1.

Figure 7:
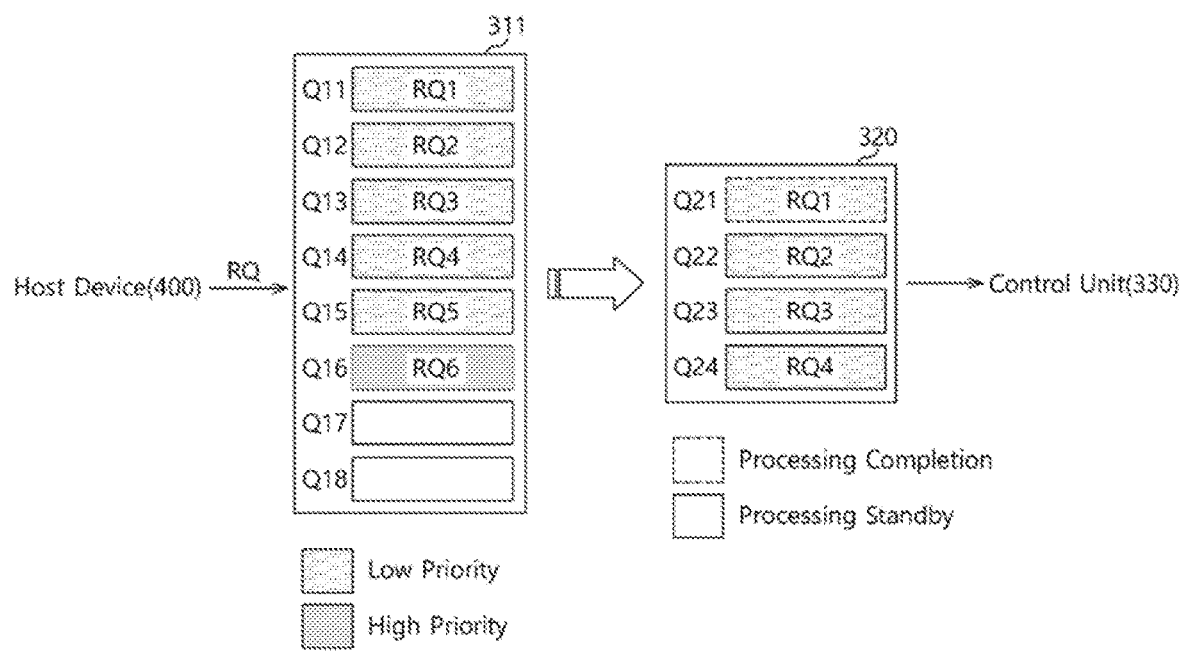
FIGS. 7 to 10 are diagrams illustrating examples of a request queuing operation based on a starvation of a request in accordance with an embodiment.

Referring to FIG. 7, as an example, a state n which five requests RQ1 to RQ5 having low priorities are respectively queued in areas Q11 to Q15 of the first queue 311 four requests RQ1 to RQ4 among them are respectively queued in areas Q21 to Q24 of the second queue 320 and then one request RQ6 having a high priority is received from the host device 400 is illustrated. Moreover, a state in which the first request RQ1 among the requests RQ1 to RQ4 queued in the second queue 320 is completely processed is illustrated.

According to these states, the host interface unit 310 should enqueue, in the second queue 320, any one between the requests RQ5 and RQ6 which are not enqueued in the second queue 320 among the requests RQ1 to RQ6 queued in the first queue 311. In this case, the host interface unit 310 may enqueue any one of the requests RQ5 and RQ6, in the second queue 320, based on priorities of the requests RQ5 and RQ6. Alternatively, the host interface unit 310 may enqueue any one of the requests RQ5 and RQ6, in the second queue 320, such that the requests RQ5 and RQ6 are reordered based on a starvation of a request.

The host interface unit 310 may determine a degree to which the starvation time of the fifth request RQ5 not enqueued in the second queue 320 and having a low priority among the requests RQ1 to RQ6 queued in the first queue 311 is imminent to a response time, and may enqueue, in the second queue 320, any one of the fifth request RQ5 having a low priority and the sixth request RQ6 having a high priority, based on a determination result.

Figure 8:
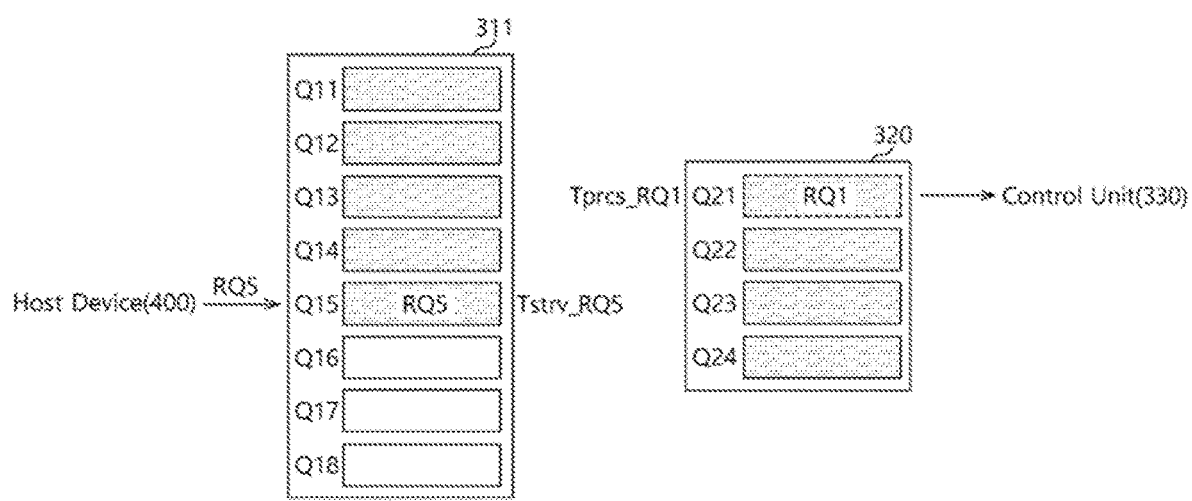

Referring to FIG. 8, the host interface unit 310 may determine starvation starvation time Tstrv_RQ5 of the fifth request RQ5 which is not enqueued in the second queue 320 and has a low priority. For example, the host interface unit 310 may count a time that is passed from a point of time at which the fifth request RQ5 is received from the host device 400, through the timer 313. Therefore, the starvation time Tstrv_RQ5 of the fifth request RQ5 may mean a time by which processing of the fifth request RQ5 is delayed.

While only the starvation time Tstrv_RQ5 of the fifth request RQ5 has been described, respective starvation times of all the requests received from the host device 400 may be managed by the host interface unit 310.

The host interface unit 310 may determine a processing time Tprcs_RQ1 of the first request RQ1 which is completely processed among the requests RQ1 to RQ4 queued in the second queue 320. For example, the host interface unit 310 may count a time that is passed from a point of time at which the first request. RQ1 is queued in the second queue 320 to a point of time at which processing completion of the first request RQ1 is notified from the control unit 330, through the timer 313. Thus, the processing time Tprcs_RQ1 of the first request. RQ1 may mean a time that is passed to process the first request RQ1.

The host interface unit 310 may compare the difference between the starvation time Tstrv_RQ5 of the fifth request RQ5 and the processing time Tprcs_RQ1 of the first request RQ1 with a reference time Tref. The host interface unit 310 may determine a degree to which the response time of the fifth request RQ5 is imminent, based on a comparison result.

A response time may mean a time limit within which the data storage device 100 should send a response to a request after the request is transmitted from the host device 400. The response time may be a time that is prescribed according to the transmission protocol between the host device 400 and the data storage device 100.

The host interface unit 310 may set a time that is obtained by subtracting an average processing time of previously processing-completed requests from the response time, as the reference time Tref. Therefore, the reference time Tref may be a time shorter than the response time.

Figure 9:
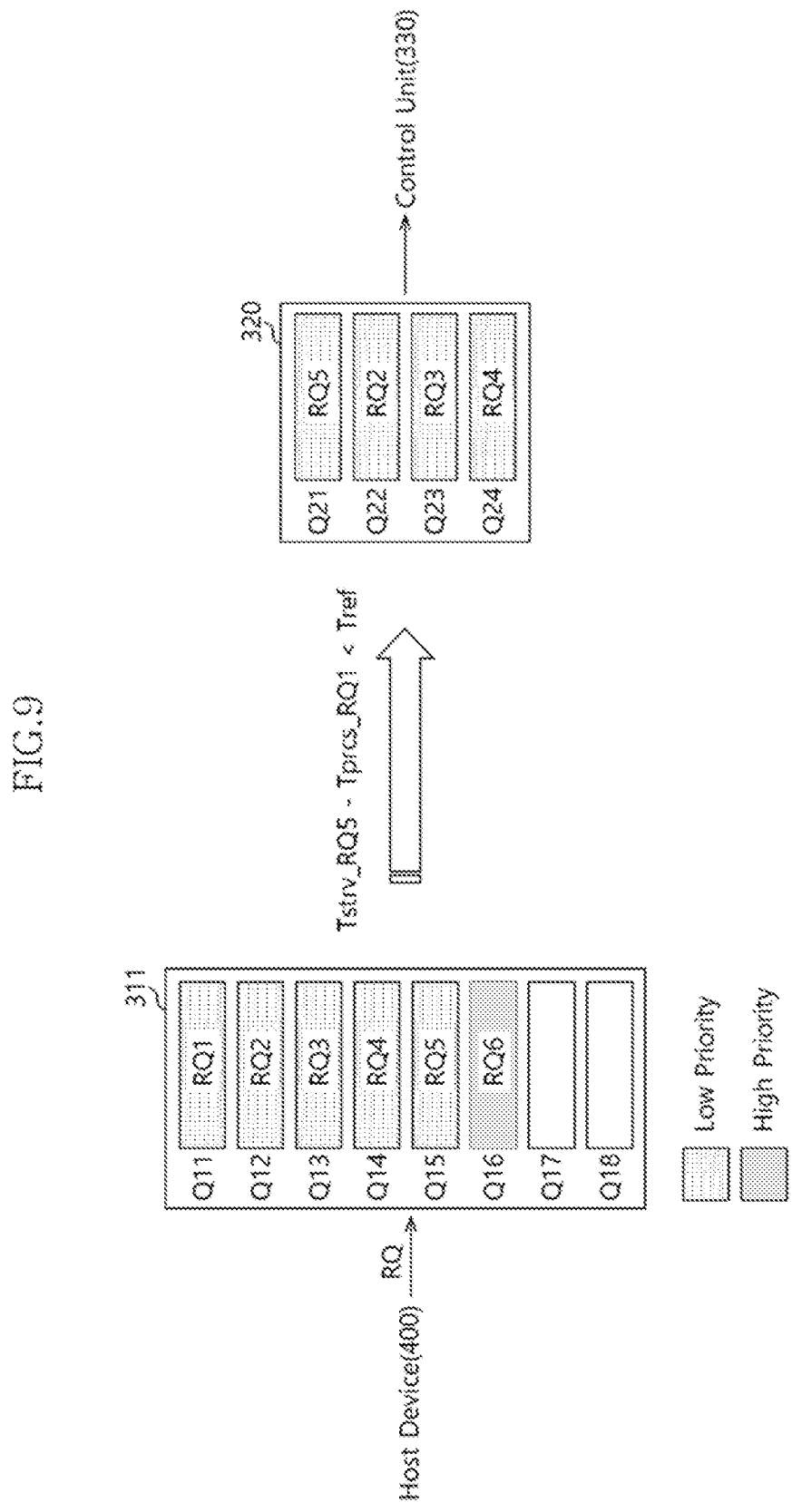

When the difference between the starvation time Tstrv_RQ5 of the fifth request RQ5 and the processing time Tprcs_RQ1 of the first request RQ1 is less than the reference time Tref, the host interface unit 310 may determine that the response time of the fifth request RQ5 is imminent. Based on such a determination result, as shown in FIG. 9, the host interface unit 310 may enqueue the fifth request RQ5 in the second queue 320 before the sixth request RQ6 even though the priority of the fifth request RQ5 is lower than the priority of the sixth request RQ6.

Figure 10:
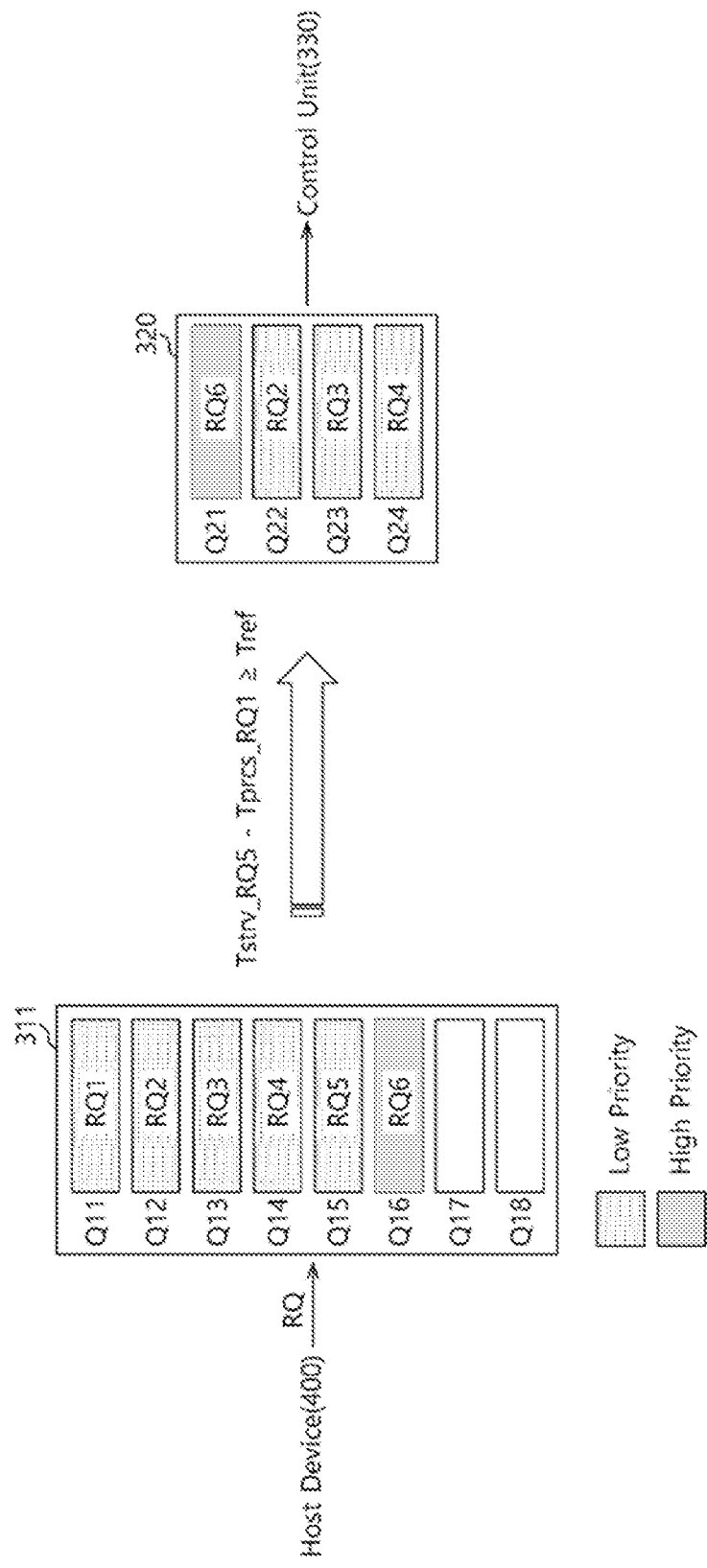

When the difference between the starvation time Tstrv_RQ5 of the fifth request RQ5 and the processing time Tprcs_RQ1 of the first request RQ1 is equal to or greater than the reference time Tref, the host interface unit 310 may determine that the response time of the fifth request RQ5 is not imminent. Based on such a determination result, as shown in FIG. 10, the host interface unit 310 may enqueue the sixth request RQ6 having a high priority in the second queue 320 based on priorities of the requests RQ5 and RQ6.

Figure 11:
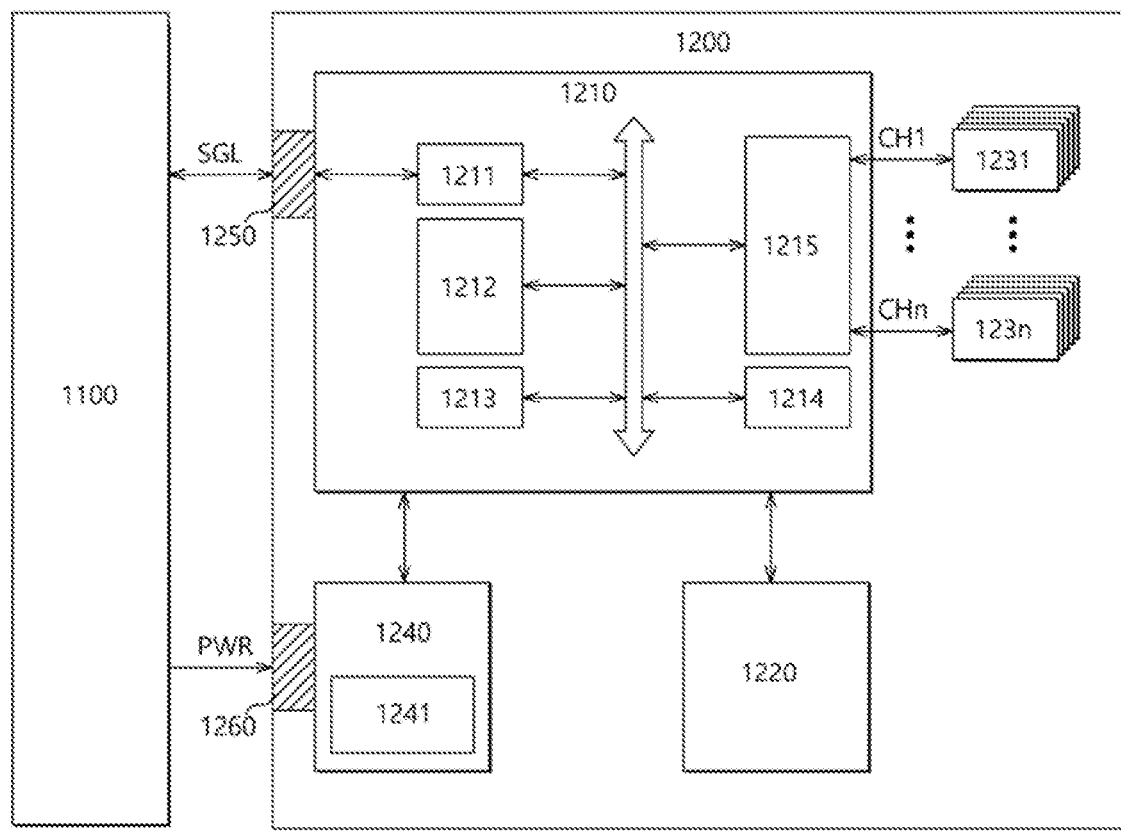
FIG. 11 is a diagram illustrating a data processing system including a solid state drive (SSD) in accordance with an embodiment.

FIG. 11 is a diagram illustrating a data processing system 1000 including a solid state drive (SSD) 1200 in accordance with an embodiment. Referring to FIG. 11, the data processing system 1000 may include a host device 1100 and the SSD 1200.

The SSD 1200 may include a controller 1210, a buffer memory device 1220, a plurality of nonvolatile memory devices 1231 to 123n, a power supply 1240, a signal connector 1250, and a power connector 1260.

The controller 1210 may control general operations of the SSD 1200. The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PITA), serial advanced technology attachment (SATA), small computer system interface (SCSI), serial attached SCSI (SAS), peripheral component interconnection (PCI), PCI express (PCI-E) and universal flash storage (UFS).

The control unit 1212 may analyze and process the signal SGL received from the host device 1100. The control unit 1212 may control operations of internal function blocks according to a firmware or a software for driving the SSD 1200. The random access memory 1213 may be used as a working memory for driving such a firmware or software.

The ECC unit 1214 may generate the parity data of data to be transmitted to at least one of the nonvolatile memory devices 1231 to 123n. The generated parity data may be stored together with the data in the nonvolatile memory devices 1231 to 123n. The ECC unit 1214 may detect an error of the data read from at least one of the nonvolatile memory devices 1231 to 123n, based on the parity data. If a detected error is within a correctable range, the ECC unit 1214 may correct the detected error.

The memory interface unit 1215 may provide control signals such as commands and addresses to at least one of the nonvolatile memory devices 1231 to 123n, according to control of the control unit 1212. Moreover, the memory interface unit 1215 may exchange data with at least one of the nonvolatile memory devices 1231 to 123n, according to control of the control unit 1212. For example, the memory interface unit 1215 may provide the data stored in the buffer memory device 1220, to at least one of the nonvolatile memory devices 1231 to 123n or provide the data read from at least one of the nonvolatile memory devices 1231 to 123n, to the buffer memory device 1220.

The buffer memory device 1220 may temporarily store data to be stored in at least one of the nonvolatile memory devices 1231 to 123n. Further, the buffer memory device 1220 may temporarily store the data read from at least one of the nonvolatile memory devices 1231 to 123n. The data temporarily stored in the buffer memory device 1220 may be transmitted to the host device 1100 or at least one of the nonvolatile memory devices 1231 to 123*n* according to control of the controller 1210.

The nonvolatile memory devices 1231 to 123*n* may be used as storage media of the SSD 1200. The nonvolatile memory devices 1231 to 123*n* may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large, capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 12:
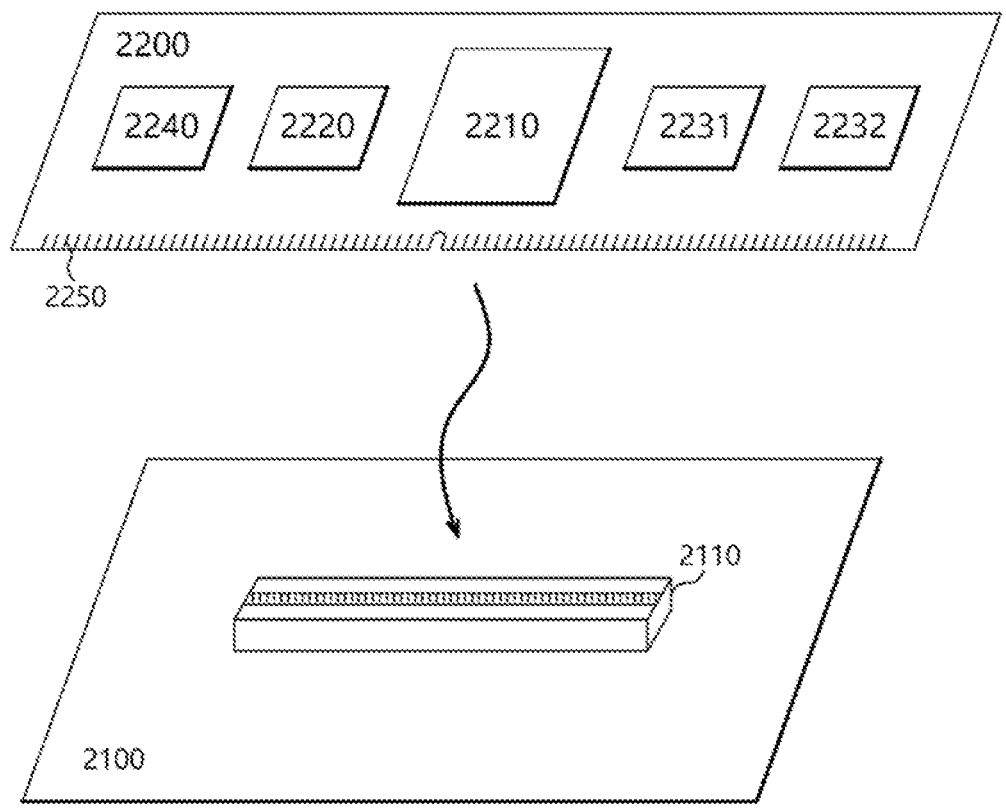
FIG. 12 is a diagram illustrating a data processing system including a data storage device in accordance with an embodiment.

FIG. 12 is a diagram illustrating a data processing system 2000 including a data storage device 2200 in accordance with an embodiment. Referring to FIG. 12, the data processing system 2000 may include a host device 2100 and the data storage device 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The data storage device 2200 may be mounted to the connection terminal 2110.

The data storage device 2200 may be configured in the form of a board such as a printed circuit board. The data storage device 2200 may be referred to as a memory module or a memory card. The data storage device 2200 may include a controller 2210, a buffer memory device 2220, nonvolatile memory devices 2231 and 2232, a power management integrated circuit (PMIC) 2240, and a connection terminal 2250.

The controller 2210 may control general operations of the data storage device 2200. The controller 2210 may be configured in the same manner as the controller 1210 shown in FIG. 11.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the data storage device 2200.

The PMIC 2240 may provide the power inputted through the connection terminal 2250, to the inside of the data storage device 2200. The PMIC 2240 may manage the power of the data storage device 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the data storage device 2200. The connection terminal 2250 may be configured into various types depending on an interface scheme between the host device 2100 and the data storage device 2200. The connection terminal 2250 may be disposed on any one side of the data storage device 2200.

Figure 13:
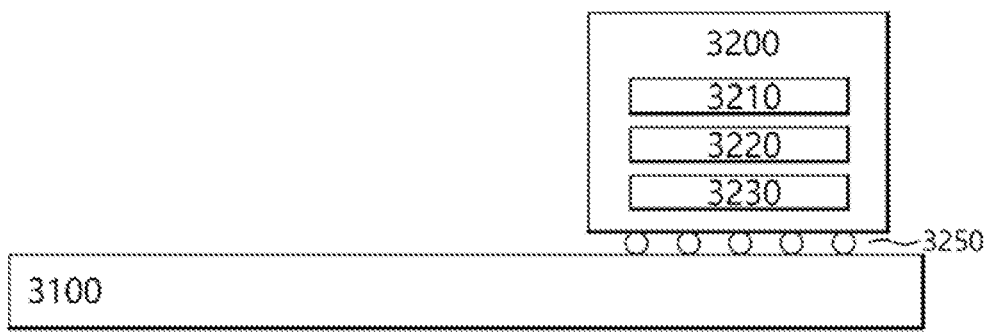
FIG. 13 is a diagram illustrating a data processing system including a data storage device in accordance with an embodiment.

FIG. 3 is a diagram illustrating a data processing system 3000 including a data storage device 3200 in accordance with an embodiment. Referring to FIG. 13, the data processing system 3000 may include a host device 3100 and the data storage device 3200.

The host device 3100 may be configured in the form of a board such as a printed circuit board. Although not shown, the host device 3100 may include internal function blocks for performing the function of a host device.

The data storage device 3200 may be configured in the form of a surface-mounting type package. The data storage device 3200 may be mounted to the host device 3100 through solder balls 3250. The data storage device 3200 may include a controller 3210, a buffer memory device 3220, and a nonvolatile memory device 3230.

The controller 3210 may control general operations of the data storage device 3200. The controller 3210 may be configured in the same manner as the controller 1210 shown in FIG. 11.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the data storage device 3200.

Figure 14:
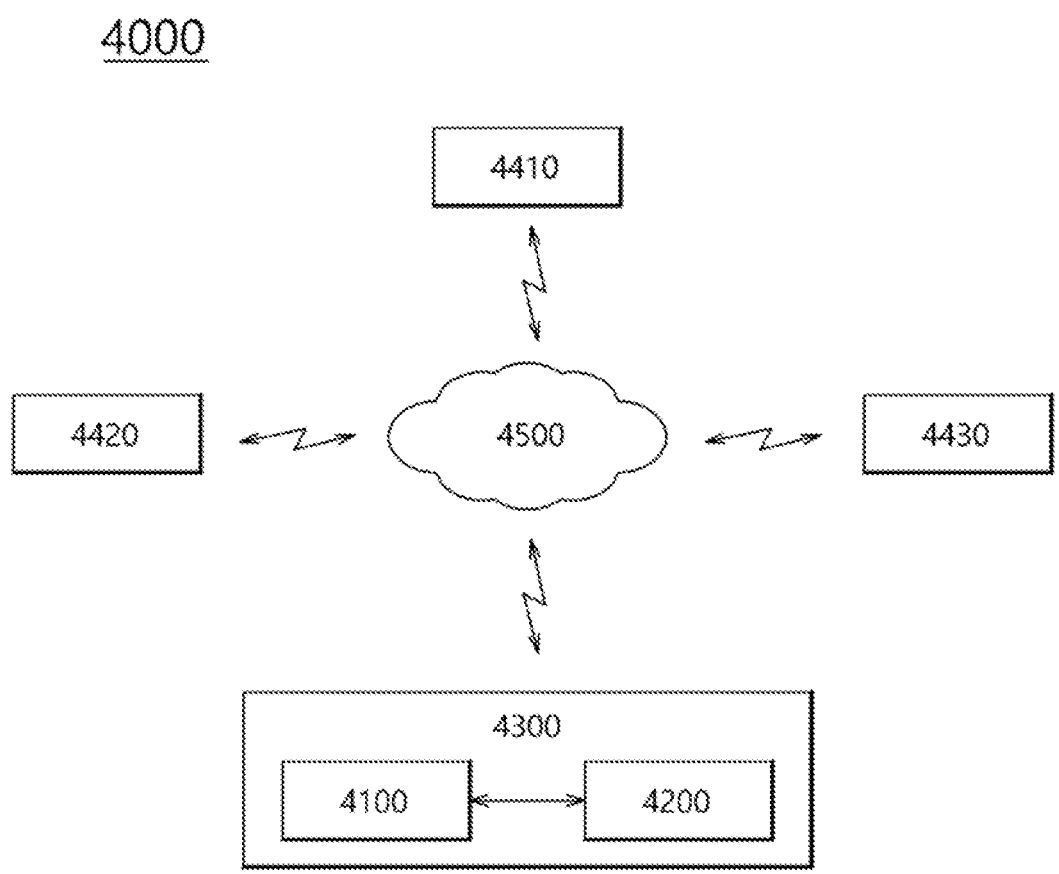
FIG. 14 is a diagram illustrating a network system including a data storage device in accordance with an embodiment.

FIG. 14 is a diagram illustrating a network system 4000 including a data storage device 4200 in accordance with an embodiment. Referring to FIG. 14, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the data storage device 4200. The data storage device 4200 may be configured by the data storage device 100 shown in FIG. 1, the data storage device 1200 shown in FIG. 11, the data storage device 2200 shown in FIG. 12 or the data storage device 3200 shown in FIG. 13.

Figure 15:
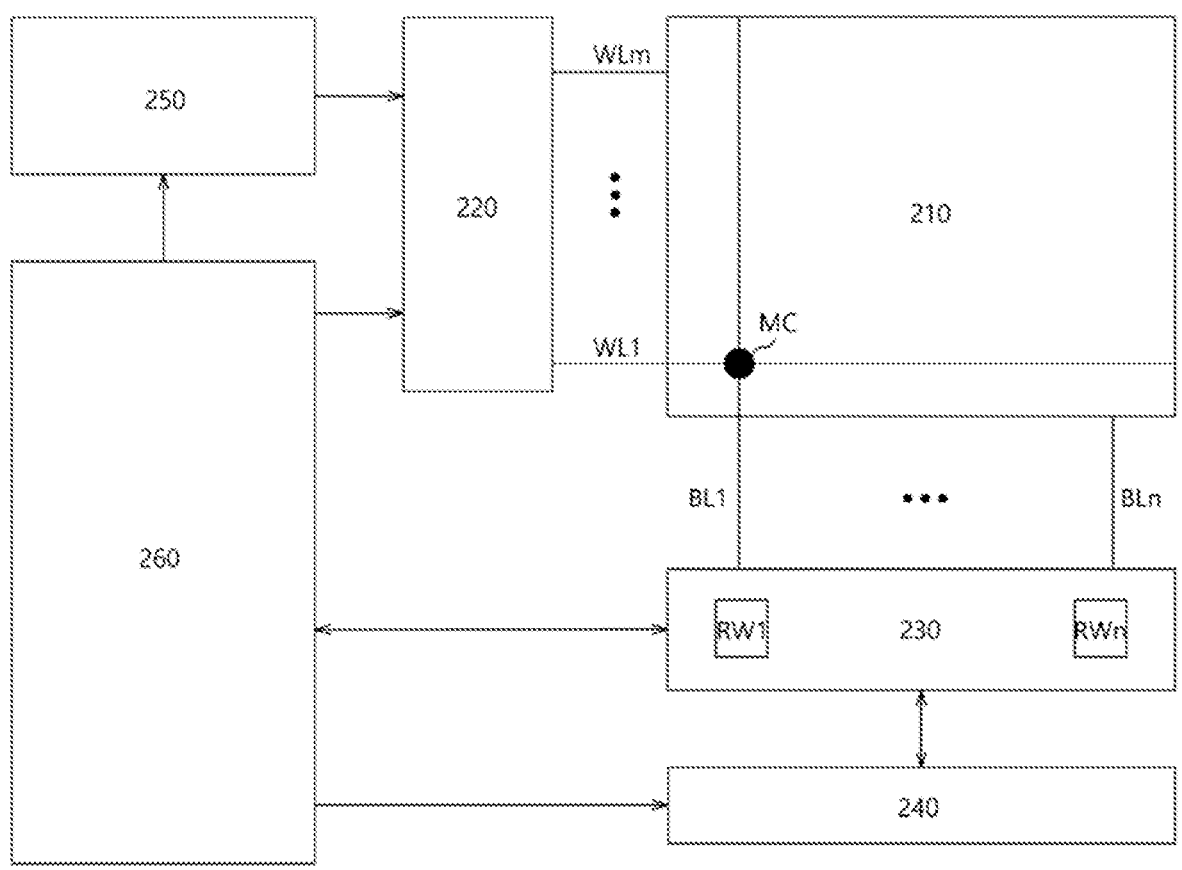
FIG. 15 is a block diagram illustrating a nonvolatile memory device included in a data storage device in accordance with an embodiment.

FIG. 15 is a block diagram illustrating a nonvolatile memory device 200 included in a data storage device in accordance with an embodiment. Referring to FIG. 15, the nonvolatile memory device 200 may include a memory cell array 210, a row decoder 220, a data read/write block 230, a column decoder 240, a voltage generator 250, and a control logic 260.

The memory cell array 210 may include memory cells MC which are arranged at areas where word lines WL1 to WLm and bit lines BL1 to BLn intersect with each other.

The row decoder 220 may be coupled with the memory cell array 210 through the word lines WL1 to WLm. The row decoder 220 may operate according to control of the control logic 260. The row decoder 220 may decode an address provided from an external device (not shown). The row decoder 220 may select and drive the word lines WL1 to WLm, based on a decoding result. For instance, the row decoder 220 may provide a word line voltage provided from the voltage generator 250, to the word lines WL1 to WLm.

The data read/write block 230 may be coupled with the memory cell array 210 through the bit lines BL1 to BLn. The data read/write block 230 may include read/write circuits RW1 to RWn respectively corresponding to the bit lines BL1 to BLn. The data read/write block 230 may operate according to control of the control logic 260. The data read/write block 230 may operate as a write driver or a sense amplifier according to an operation mode. For example, the data read/write block 230 may operate as a write driver which stores data provided from the external device, in the memory cell array 210 in a write operation. For another example, the data read/write block 230 may operate as a sense amplifier which reads out data from the memory cell array 210 in a read operation.

The column decoder 240 may operate according to control of the control logic 260. The column decoder 240 may decode an address provided from the external device. The column decoder 240 may couple the read/write circuits RW1 to RWn of the data read/write block 330 respectively corresponding to the bit lines BL1 to BLn with data input/output lines or data input/output buffers, based on a decoding result.

The voltage generator 250 may generate voltages to be used in internal operations of the nonvolatile memory device 200. The voltages generated by the voltage generator 250 may be applied to the memory cells of the memory cell array 210. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 260 may control general operations of the nonvolatile memory device 200, based on control signals provided from the external device. For example, the control logic 260 may control operations of the nonvolatile memory device 200 such as read, write and erase operations of the nonvolatile memory device 200.

While various embodiments have been described above, it will be understood to those skilled in the art that the embodiments described are examples only. Accordingly, the data storage device and the operating method thereof described herein should not be limited based on the described embodiments.

The embodiments of the present disclosure have been disclosed above for illustrative purposes. Those of ordinary skill in the art will appreciate that various modifications, additions, and substitutions are possible, without departing from the scope and spirit of the present disclosure as disclosed in the accompanying claims.

What is claimed is:

1. A method for operating a data storage device, the method comprising:
enqueuing requests for a nonvolatile memory device, received from a host device, in a first queue;
determining whether a starvation time of a request which is not enqueued in a second queue and has a relatively low priority, among the requests queued in the first queue is reaching to a predetermined response time; and
enqueuing, based on a determination result, any one between the request which has the low priority and a request which is not enqueued in the second queue and has a high priority among the requests queued in the first queue, in the second queue,
wherein the determining of whether the starvation time is reaching to the predetermined response time comprises comparing a difference between the starvation time and a processing time of a request which is completely processed among requests queued in the second queue, with a reference time, and counting a time that is passed from a point of time at which the completely processed request is queued in the second queue to a point of time at which the request is completely processed, as the processing time.

2. The method according to claim 1, wherein, when the difference between the starvation time and the processing time is less than the reference time, the request having the low priority is enqueued in the second queue.

3. The method according to claim 1, wherein, when the difference between the starvation time and the processing time is equal to or greater than the reference time, the request having the high priority is enqueued in the second queue.

4. The method according to claim 1, further comprising:
setting a time that is obtained by subtracting an average processing time of previously processing-completed requests from the response time, as the reference time.

5. The method according to claim 1, further comprising:
counting a time that is passed from a point of time at which the request having the low priority is queued in the first queue, as the starvation time.

6. The method according to claim 1, wherein the response time includes a time limit within which a response should be sent after the request having the low priority is received from the host device.

7. A data storage device comprising:
a first queue suitable for queuing requests received from a host device;
a second queue suitable for queuing some of the requests queued in the first queue; and
a host interface suitable for enqueuing the requests queued in the first queue, in the second queue such that the requests are reordered,
wherein the host interface determines a degree to which a starvation time of a request which is not enqueued in a second queue and has a relatively low priority, among the requests queued in the first queue is reaching to a predetermined response time, and enqueues, based on a determination result, any one between the request which has the low priority and a request which is not enqueued in the second queue and has a high priority among the requests queued in the first queue, in the second queue,
wherein, in order to determine whether the starvation time is reaching to the predetermined response time, the host interface compares a difference between the starvation time and a processing time of a request which is completely processed among requests queued in the second queue, with a reference time, and
wherein the host interface counts a time that is passed from a point of time at which the completely processed request is queued in the second queue to a point of time at which the request is completely processed, as the processing time, through a timer.

8. The data storage device according to claim 7, wherein, when the difference between the starvation time and the processing time is less than the reference time, the host interface enqueues the request having the low priority, in the second queue.

9. The data storage device according to claim 7, wherein, when the difference between the starvation time and the processing time is equal to or greater than the reference time, the host interface unit enqueues the request having the high priority, in the second queue.

10. The data storage device according to claim 7, wherein the host interface comprises the timer which counts at least one of the starvation time and the processing time.

11. The data storage device according to claim 10, wherein the host interface counts a time that is passed from a point of time at which the request having the low priority is queued in the first queue, as the starvation time, through the timer.

12. The data storage device according to claim 7, wherein the host interface sets a time that is obtained by subtracting an average processing time of previously processing-completed requests from the response time, as the reference time.

13. The data storage device according to claim 7, wherein the response time includes a time limit within which a response should be sent after the request having the low priority is received from the host device.

14. The data storage device according to claim 7, further comprising:

a nonvolatile memory device; and a controller suitable for controlling the nonvolatile memory device to process the requests queued in the second queue.

* * * * *